United States Patent [19]

Hardin et al.

[11] Patent Number: 4,969,706
[45] Date of Patent: Nov. 13, 1990

[54] PLENUM CABLE WHICH INCLUDES HALOGENATED AND NON-HALOGENATED PLASTIC MATERIALS

[75] Inventors: Tommy G. Hardin, Lilburn; Behrooz A. Khorramian, Norcross, both of Ga.

[73] Assignee: AT&T Bell Laboratories, Murray Hill, N.J.

[21] Appl. No.: 343,100

[22] Filed: Apr. 25, 1989

[51] Int. Cl.$^5$ ........................ G02B 6/44; H02G 3/00; H01B 7/00
[52] U.S. Cl. ............................ 350/96.23; 350/96.34; 174/70 R; 174/110 SR; 174/110 S; 174/110 FC; 174/121 A; 174/120 SR
[58] Field of Search ............... 350/96.10, 96.23, 96.33, 350/96.34; 174/70 R, 110 R, 107, 110 FC, 110 N, 120 AR, 120 SR, 120 R, 121 A, 110 S; 427/163; 524/94, 273, 274

[56] References Cited

U.S. PATENT DOCUMENTS

| | | | |
|---|---|---|---|
| 4,076,382 | 2/1978 | Oestreich | 350/96.23 |
| 4,284,342 | 8/1981 | Arroyo et al. | 174/107 |
| 4,500,748 | 2/1985 | Klein | 174/121 A |
| 4,514,036 | 4/1985 | McDonald | 350/96.23 |
| 4,575,184 | 3/1986 | Ueno et al. | 350/96.23 |
| 4,605,818 | 8/1986 | Arroyo et al. | 174/107 |
| 4,690,997 | 9/1987 | Cella et al. | 528/26 |
| 4,808,686 | 2/1989 | Cella et al. | 528/27 |
| 4,826,899 | 5/1989 | Rees | 524/94 |
| 4,848,869 | 7/1989 | Urruti | 350/96.33 |
| 4,881,794 | 11/1989 | Bartoszek | 350/96.23 |

FOREIGN PATENT DOCUMENTS

| | | | |
|---|---|---|---|
| 0054424 | 6/1982 | European Pat. Off. | 524/94 X |
| 20301543 | 2/1989 | European Pat. Off. | 350/96.34 X |
| 18109304 | 6/1981 | Fed. Rep. of Germany | 174/70 R X |
| 2130785 | 6/1984 | United Kingdom | 174/90 R X |

OTHER PUBLICATIONS

"Norway's PTT Forces Halogen-free Alternative in Cable Covering".
Tender by Telecom Australia dated 9/3/85.
"Extrusion of Noryl Resin PX1766 in the Wire Insulation Process", *Extrusion, Allianz Versicherungs-AG Technische Information (1980)*.
Brochure of the Union Carbide Corporation discloses thermoplastic non-halogen flame retardant jacketing material.
General Electric's NORYL PX1766 undated brochure.
Fire and Flammability Bulletin, vol. 9, No. 7 dated Feb. 1988.
AT&T Practice Standard Issue 3, Nov. 1987 entitled "Fire Safety Considerations of Cable Buildings".
"Fire Testing of Riser Cables", by L. J. Przybyla appearing in vol. 3 Jan./Feb. '85 issue of *Journal of Fire Sciences*.
Article by S. Kaufman entitled "Using Combustion Toxicity Data In Cable Selection", pp. 636–643 1988 International Wire and Cable Symposium Proceedings (IWCS).
S. Kaufman's article entitled "PVC in Communication Cable", published in the Journal of Vinyl Technology, Sep. '85, vol. 7, #3.
S. Kaufman's article in "The 1987 National Electrical Code Requirements for Cable", beginning at p. 545, IWCS 1986.

(List continued on next page.)

*Primary Examiner*—Brian Healy
*Attorney, Agent, or Firm*—Edward W. Somers

[57] ABSTRACT

A plenum cable (20) includes a core (22) comprising at least one transmission medium such as a metallic conductor. The metallic conductor is insulated with a layer (27) of a plastic composition of material which includes a non-halogenated constituent such as, for example, a polyetherimide. Covering the insulated metallic conductor is a jacket (39) comprising a halogenated material such as a fluoropolymer. The cable exhibits excellent flame retardant properties as well as acceptable levels of corrosion and toxicity.

14 Claims, 4 Drawing Sheets

OTHER PUBLICATIONS

"Flammability of Polymers: Test Methods", appears beginning at p. 1797 of the Encyclopedia of Materials Science and Engineering, (1986).

Article by R. O. Johnson & H. S. Burlhis entitled "Polyethermide: A New High Performance Thermoplastic Resin", p. 129 of the Journal of Polymer Science: Polymer Symposium 70, 129-143 (1983).

Brochures by General Electric entitled "Silicone Polyimide Copolymer Processing Conditions", Combustion Characteristics of ULTEM Resins, dated 1/7/87.

Technical Marketing Bulletin–"Extrusion Guidelines for ULTEM 1000", dated 4/10/82.

"481-XV-40 Silicone-Polyimide Copolymer"-Preliminary Silicone Product Info.

Brochure entitled "Smoke Density and Toxicity".

Publication by General Electric entitled "ULTEM Resins Design Guide".

Article from *New Products* entitled "Initial and Secondary Fire Damage Costs".

Article from *Telecommunication Journal,* entitled "Fire Precautions in Telephone Exchange" vol. 49, 1982, p. 223.

In *Interview* an interview with Hans de Munck entitled "Developing Noryl Resin PX1766".

Article authored by Messrs. S. Artingstall, A. J. Pyle, and Dr. J. A. Taylor entitled "Recent Advances in Thermoplastic, Zero Halogen, Low Smoke, Fire Retardant Cable Compound Technology", Int. Wire and Cable Sym. Pro. 1987 pp. 254-263.

S. Kaufman et al. "A Test Method for Measuring and Classifying the Flame Spreading and Smoke Generating Characteristiics of Communications Cable".

S. Kaufman "The 1987 National Electrical Code Requirements for Optical Fiber Cable".

"Cable Catastrophes", The Sentinel, Jul.-Aug. 1979.

PLENUM CABLE WHICH INCLUDES HALOGENATED AND NON-HALOGENATED PLASTIC MATERIALS

TECHNICAL FIELD

This invention relates to a building plenum cable. More particularly, the invention relates to cables which may be used in plenums and which include both halogenated and non-halogenated plastic materials.

BACKGROUND OF THE INVENTION

In many building a drop ceiling is spaced below a structural floor panel that is constructed of concrete, for example. Light fixtures as well as other items appear below the drop ceiling. The space between the ceiling and the structural floor panel from which it is suspended serves as a return-air plenum for elements of heating and cooling systems as well as a convenient location for the installation of communications cables including those for computers and alarm systems. It is not uncommon for these plenums to be continuous throughout the length and width of each floor. Also, the space under a raised floor in a computer room is considered a plenum if it is connected to a duct or to a plenum.

When a fire occurs in an area between a floor and a drop ceiling, it may be contained by walls and other building elements which enclose that area. However, if and when the fire reaches the plenum, and if flammable material occupies the plenum, the fire can spread quickly throughout an entire story of the building. The fire could travel along the length of cables which are installed in the plenum if the cables are not rated for plenum use. Also, smoke can be conveyed through the plenum to adjacent areas and to other stories.

A non-plenum rate cable sheath system which encloses a core of insulated copper conductors and which comprises only a conventional plastic jacket may not exhibit acceptable flame spread and smoke evolution properties. As the temperature in such a cable rises, charring of the jacket material may occur. Afterwards, conductor insulation inside the jacket begins to decompose and may char. If the jacket char retains its integrity, it functions to insulate the core; if not, it ruptures either by the expanding insulation char, or by the pressure of gases generated from the insulation exposed to elevated temperature, exposing the virgin interior of the jacket and insulation to elevated temperatures. The jacket and the insulation begin to pyrolize and emit more flammable gases. These gases ignite and, because of air drafts with the plenum, burn beyond the area of flame impingement, propagating flame and generating smoke and possibly toxic and corrosive gases.

As a general rule, the National Electrical Code (NEC) requires that power-limited cables in plenums be enclosed in metal conduits. The initial cost of metal conduits for communications cables in plenums is relatively expensive. Also, conduit is relatively inflexible and difficult to maneuver in plenums. However, the NEC permits certain exceptions to this requirement provided that such cables are tested and approved by an independent testing agent such as the Underwriters Laboratories (UL) as having suitably low flame spread and smoke-producing characteristics. The flame spread and smoke production of cable are measured using UL 910, Standard Test Method for Fire and Smoke characteristics of Electrical and Optical-Fiber Cables Used in Air-Handling Spaces. See S. Kaufman "The 1987 National Electric Code Requirements for Cable" which appeared in the 1986 International Wire and Cable Symposium Proceedings beginning at page 545.

The prior art has addressed the problem of cable jackets that contribute to flame spread and smoke evolution also through the use of fluoropolymers. These together with layers of other material, have been used to control char development, jacket integrity and air permeability to minimize restrictions on choices of materials for insulation within the core. Commercially available fluorine-containing polymer materials have been accepted as the primary insulative covering for conductors and as a jacketing material for plenum cable without the use of metal conduit. In one prior art small size plenum cable, disclosed in U.S. Pat. No. 4,605,818 which issued on Aug. 12, 1986 in the names of C. J. Arroyo, et al., a sheath system includes a layer of a woven material which is impregnated with a fluorocarbon resin and which encloses a core. The woven layer has an air permeability which is sufficiently low to minimize gaseous flow through the woven layer and to delay heat transfer to the core. An outer jacket of an extrudable fluoropolymer material encloses the layer of woven material. In the last-described cable design, a substantial quantity of fluorine, which is a halogen, is used. Fluoropolymer materials are somewhat difficult to process especially for insulation covers. Also, some of those fluorine-containing materials have a relatively high dielectric constant which makes them unattractive as insulation for communications conductors.

Further, a fluoropolymer is a halogenated material. Although there exist cables which include halogen materials and which have passed the UL 910 test requirements, there has been a desire to overcome some problems which still exist with respect to the use of halogenated materials such as fluoropolymers and polyvinyl chloride (PVC). These materials exhibit undesired levels of corrosion. If a fluoropolymer is used, hydrogen fluoride forms under the influence of heat, causing corrosion and a level of toxicity which is not as low as desired.

Generally, there are a number of halogenated materials which pass the industry tests. However, if halogenated materials exhibit some less than desired characteristics as required by industry standards in the United States, it is logical to inquire as to why non-halogenated materials have not been used for cable materials. The prior art has treated non-halogenated materials as unacceptable because, as a general rule, they are not as flame retardant or because they are too inflexible if they are flame retardant. Materials for use in communications cables must be such that the resulting cable passes as industry standard flame test. For example, for plenum cable, such a test is the UL 910 test. The UL 910 test is conducted in an apparatus which is known as the Steiner Tunnel, Many non-halogenated plastic materials have not passed this test.

Non-halogenated materials have been used in countries outside the United States. One example of a non-halogenated material that has been offered as a material for insulating conductors is a polyphenylene oxide plastic material. Inasmuch as this material has not passed successfully industry standard tests in the United States for plenum use, there have been ongoing efforts to provide a non-halogenated material which has a broad range of acceptable properties, as well as a reasonable price and yet one which passes the UL 910 test for plenum cables. Such a cable should be one which appeals to a broad spectrum of customers.

In recently filed U.S. application Ser. No. 303,212 (filed Jan. 27, 1989), pending, a plenum cable is disclosed in which each transmission medium may include optical fiber or metallic conductors. Each transmission medium is enclosed with a non-halogenated plastic material selected from the group consisting of a polyetherimide, a silicon-polyimide copolymer or blends of these two materials. A jacket encloses the core and is made of a non-halogenated plastic material which includes a silicone-polyimide copolymer or its blend with a polyetherimide.

Although it is believed that the use of non-halogenated materials for both insulation and jacket in plenum cables will enjoy wide acceptance in the future, there is still a need for a plenum cable for the near term which overcomes problems of the prior art cables but which is not such a radical departure from the past. Such a cable would be one which is cost competitive with those now used and which incorporates at least some of the present technology.

The sought-after cable not only exhibits suitably low flame spread and low smoke producing characteristics provided by currently used cables which include only halogenated materials but also is one which meets a broad range of desired properties such as acceptable levels of corrosivity and toxicity. Such a cable does not appear to be available in the prior art. What is further sought is a cable which is characterized as having relatively lower corrosive and toxicity properties, as well as low levels of smoke generation when compared to those properties of existing cables and one which is readily processable at reasonable costs.

SUMMARY OF THE INVENTION

The foregoing problems of the prior art have been overcome with the cables of this invention. A plenum cable of this invention includes a core comprising at least one transmission medium, such as a metallic conductor, for example, and an insulation material which encloses the at least one metallic conductor. The insulation material is a non-halogenated material selected from the group consisting of a polyetherimide, a silicone polyimide copolymer and compositions comprising a blend of a polyetherimide and a silicone-polyimide copolymer. Covering the core is a jacket which is a halogenated plastic material. The jacket may comprise a fluoropolymer such as a copolymer of ethylene and chlorotrifluoroethylene.

Advantageously, the cables of this invention provide the best of several material classes. The non-halogenated insulation material is relatively easy to process and has acceptable flame retardancy. The jacket material to which the industry is accustomed has excellent flame retardancy. The resultant cable passes the UL 910 test and exhibits improved levels of corrosion and toxicity when compared to existing plenum cables in which the insulation and jacketing comprise halogenated plastic materials.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
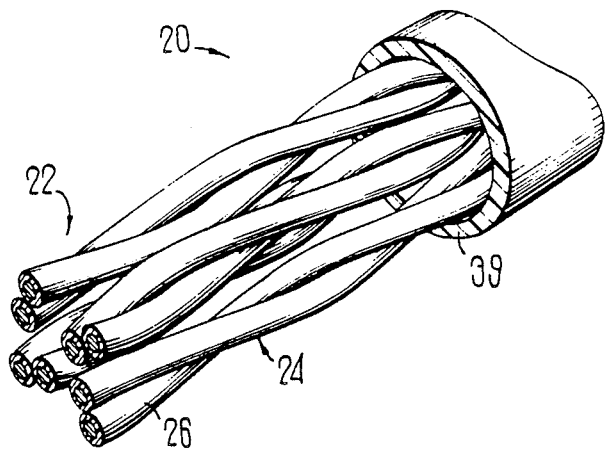
FIG. 1 is a perspective view of a cable of this invention.
Figure 2:
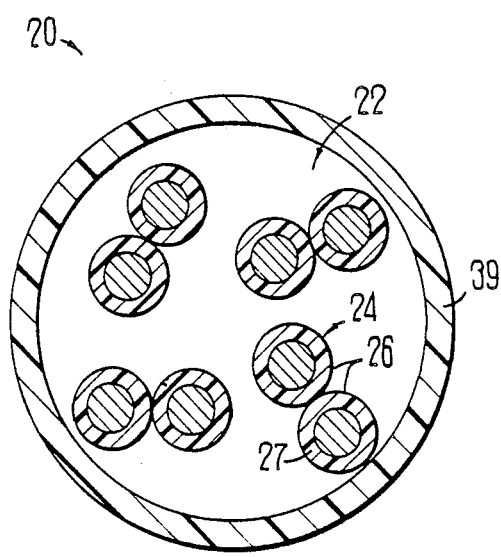
FIG. 2 is an end cross-sectional view of the cable of FIG. 1 with spacing among pairs of conductors being exaggerated.
Figure 3:
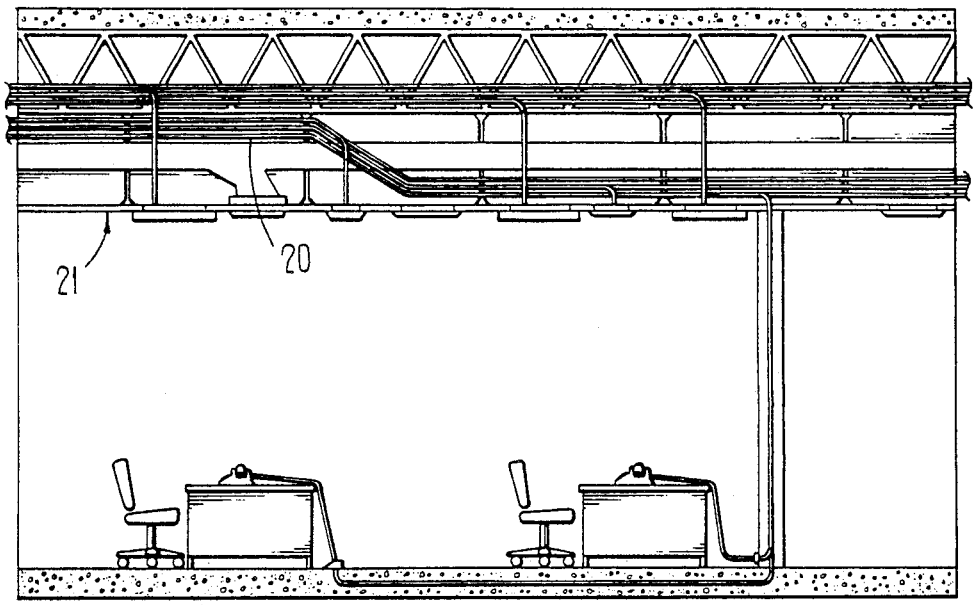
FIG. 3 is an elevational view of a portion of a building which includes a plenum, depicting the use of cables of this invention.

Referring now to FIGS. 1 and 2 there is shown a cable which is designated generally by the numeral 20 and which is capable of being used in buildings in plenums. A typical building plenum 21 is depicted in FIG. 3. There a cable 20 of this invention is disposed in the plenum. As can be seen in FIGS. 1 and 2, the cable 20 includes a core 22 which comprises at least one transmission medium. The core 22 which may be enclosed by a core wrap (not shown) may be one which is suitable for use in data, computer, alarm and signaling networks as well as in voice communication.

For purposes of the description hereinafter, the transmission medium comprises twisted pairs 24—24 of insulated metallic conductors 26-26. Although some cables which are used in plenums may include twenty-five or more conductor pairs, many such cables include as few as six, four, two or even single conductor pairs (see FIG. 2).

In order to provide the cable 20 with flame retardancy, and acceptable levels of toxicity and corrosivity as well as low smoke generation properties, the metallic conductors are provided with an insulation 27 comprising a plastic material which provides those properties. The metallic conductors each may be provided with an insulation cover comprising a non-halogenated material and having a thickness in the range of about 0.005 to 0.007 inch. An acceptable non-halogenated material is a polyetherimide. Polyetherimide is an amorphous thermoplastic resin which is available commercially, for example, from the General Electric Company under the designation ULTEM® resin. The resin is characterized by a relatively high deflection temperature of 200° C. at 264 psi, a relatively high tensile strength and flexural modulus and very good retention of mechanical properties at elevated temperatures. It inherently is flame resistant without the use of other constituents and has a limiting oxygen index of 47.

Polyetherimide is a polyimide having other linkages incorporated into the polyimide molecular chain to provide sufficient flexibility to allow suitable melt processability. It retains the aromatic imide characteristics of excellent mechanical and thermal properties. Polyetherimide is described in an article authored by R. O. Johnson and H. S. Burlhis entitled "Polyetherimide: A New High-Performance Thermoplastic Resin" which appeared beginning at page 129 in the 1983 Journal of Polymer Science.

It should be noted that the insulation 27 may comprise materials other than the polyetherimide. For example, the insulation may be a composition comprising a silicone-polyimide copolymer or a composition comprising a blend of a polyetherimide and a silicone-polyimide copolymer. Silicone-polyimide copolymer is a flame-resistant non-halogen containing thermoplastic material. A suitable silicone material is a silicone-polyetherimide copolymer which is a copolymer of siloxane and etherimide. One such material is designated SILTEM ™ copolymer and is available commercially from the General Electric Company. The polyetherimide of the blend composition ranges from about 0% to about 100% by weight of the composition and the silicone-polyimide copolymer provides the balance of the percent composition and ranges from about 0% to about 100% by weight of the composition.

In the past, the cable industry in the United States has shied away from non-halogenated materials for use in plenum cables. These non-halogenated materials which possess desired properties seemingly were too inflexible to be used in such a product whereas those non-halogenated materials which had the desired amount of flexibility did not meet the higher United States standards for plenum cable. What is surprising is that the transmission medium covers of the cable of this invention include non-halogenated materials and yet the cable meets UL 910 test requirements.

Figure 4:
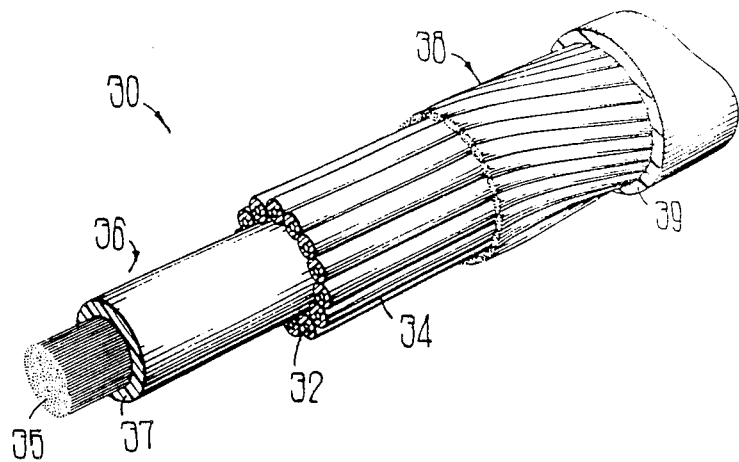
FIGS. 4 and 5 are perspective and end views of an optical fiber cable of this invention.
Figure 5:
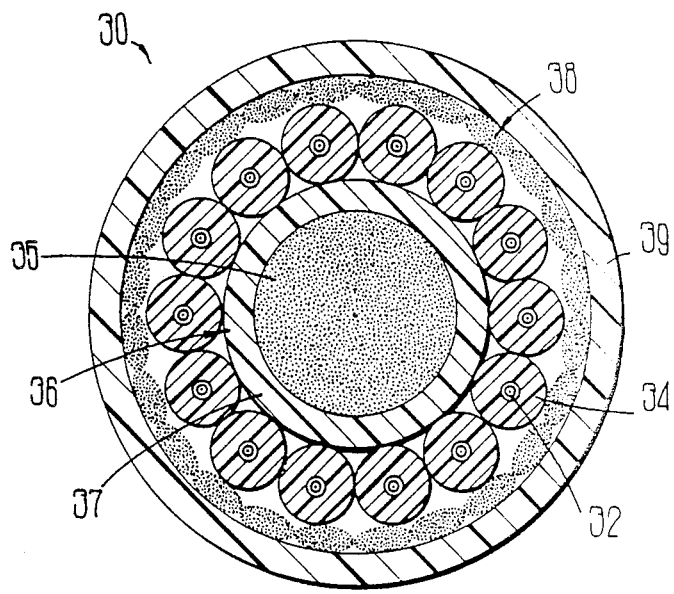

For optical fiber cables in which optical fibers are provided with a buffer layer, a silicone-polyimide copolymer is preferred as the material for the buffer layer. The silicone-polyimide copolymer has a lower modulus than the polyetherimide which reduces the possibility of inducing microbending loss into the optical fibers. A typical optical fiber plenum cable 30 is shown in FIGS. 4 and 5. The cable 30 includes a plurality of coated optical fibers 32—32 each covered with a buffer layer 34 of a silicone-polyimide copolymer or a SILTEM ™ copolymer. As is seen, the plurality of optical fibers is disposed about a central organizer 36 which may include KEVLAR ® yarn 35 enclosed in an ULTEM ® or ULTEM ® polyetherimide blend tube 37 and enclosed in a layer 38 of a strength material such as KEVLAR ® yarn.

Each of the cables 20 and 30 includes a jacket 39. The jacket 39 which in a preferred embodiment has a thickness of about 0.008 to 0.010 inch is comprised of a plastic material which is a halogenated plastic material. In the preferred embodiment, the halogenated plastic material is a fluoropolymer. A suitable fluoropolymer plastic material is HALAR ® fluoropolymer plastic material which is available from the Ausimont Company, Fluoropolymers Division in Morristown, N.J. HALAR ® fluoropolymer exhibits excellent flame-retardant properties. It has relatively low flame and low smoke producing characteristics.

Materials other than HALAR ® fluoropolymer also may be used. For example KYNAR ® fluoropolymer which is a poly(1,1-difluoroethene) material and commonly referred to as polyvinylidene fluoride is suitable and is available from the Pennwalt Corporation. Another suitable material is SOLEF ® fluoropolymer which is a copolymer of 1,1-difluoroethylene and hexofluoropropylene and which is available from the SOLTEX Polymer Corporation.

The fluoropolymer material is not used for the conductor insulation because it does not process consistently nor does it have the desired thermal stability. In order to overcome this problem, a thermal stabilizer is added to the fluoropolymer. Further, the fluoropolymer is relatively expensive on a basis of cost per volume.

On the other hand, a polyetherimide such as ULTEM ® polyetherimide is thermally stable and thus does not require an additive such as a thermal stabilizer during the processing. Further, the polyetherimide is halogen free and produces relatively low smoke and corrosive gases. Because of the absence of additives, the polyetherimide lots are expected to be uniform and consistent in their thermal stability. This differs from fluoropolymer insulation grade material. A fluoropolymer, due to the nature of its polymerization, is provided commercially with a thermal stabilizer system. The purpose of the thermal stabilizer system is to provide adequate protection for the thermally weak sites in the polymer chain. A small quantity of a thermal stabilizer such as 0.5% is added to this polymer for this purpose. Because the fluoropolymer is a solid material, it is difficult to add, for example, 0.5% of a stabilizer and expect a consistent mixing. As a result, degradation occurs. This is particularly true because the stabilizer itself volatilizes when it experiences heat. Therefore when the composition is melted to produce pellets, some of the stabilizer volatilizes and hence is not available as the pellets are moved along the various stages of an extruder barrel.

Notwithstanding these problems, the fluoropolymer is still acceptable for use in the plenum cable jacket. However, it is not as acceptable for use in insulation where the material must meet particular electrical requirements. These are a function of insulation wall thickness, e.g. 0.005 to 0.006 inch, which is difficult to control particularly with a lack of consistency during the extrusion process. On the other hand, the jacket is substantially more thick and easier to control.

Flame spread and smoke evolution characteristics of cables may be demonstrated by using a well known Steiner Tunnel test in accordance with ASTM E-84 as modified for communications cables and now referred to as the UL 910 test. The UL 910 test is described in the previously identified article by S. Kaufman and is a test method for determining the relative flame propagation and smoke generating characteristics of cable to be installed in ducts, plenums, and other spaces used for environmental air. Tests have shown that heat is transferred to the cable core 22 principally by thermal radiation, secondly by conduction and finally by convection.

During the Steiner Tunnel test, flame spread is observed for a predetermined time and smoke is measured by a photocell in an exhaust duct. For a cable to be rated as plenum, i.e. type CMP, according to the NEC, flame spread must not exceed five feet. A measure of smoke evolution is termed optical density which is an obstruction measurement over a length of time as seen by an optical detector. The lower the optical density, the lower and hence the more desirable is the smoke characteristic. A cable designated CMP must have a maximum smoke density which is 0.5 or less and an average smoke density which is 0.15 or less.

Low toxicity generating characteristics of cables may be demonstrated by a toxicity test developed by the University of Pittsburgh. In this test, a parameter referred to as $LC_{50}$ which is the lethal concentration of gases generated from the burning of a material which causes a 50% mortality among an animal population, that is, 2 out of 4 mice, for example, is measured. $LC_{50}$ is an indication of the toxicity of a material caused by gases generated from its burning. The higher the value of the $LC_{50}$, the lower the indication of its toxicity. The higher the $LC_{50}$ value, the more material that must be burned to kill the same number of test animals. It is important to recognize that $LC_{50}$ is measured for the plastic material used in the cable without the metallic conductors. The $LC_{50}$ values for cables of this invention were higher than those for comparable cables which included halogenated insulating materials.

Low corrosion characteristics of the cables may be demonstrated by the measurement of the acid gases generated from the burning of the cable. The higher the percent acid gas generated, the more corrosive is the plastic material which encloses the transmission media. This procedure is currently used in a U.S. government military specification for shipboard cables. Plenum cables of this invention showed about 35% lower generation of acid gas than those in which both the insulation and the jacketing were made of halogenated materials.

Test results for example cables of this invention as well as for similar plenum cables having halogenated materials for insulation and jacketing are shown in TABLE I hereinafter. Being plenum rated, the cables of TABLE I pass the UL 910 test for flame spread and smoke generation.

Example cables were subjected to tests in as Steiner Tunnel in accordance with the priorly mentioned UL 910 test and exposed to temperatures of 904° C., or incident heat fluxes as high as 63 kw/m$^2$.

by weight. The jacket 45 also comprises fluoropolymer such as HALAR ® fluoropolymer.

Figures 7, 8:
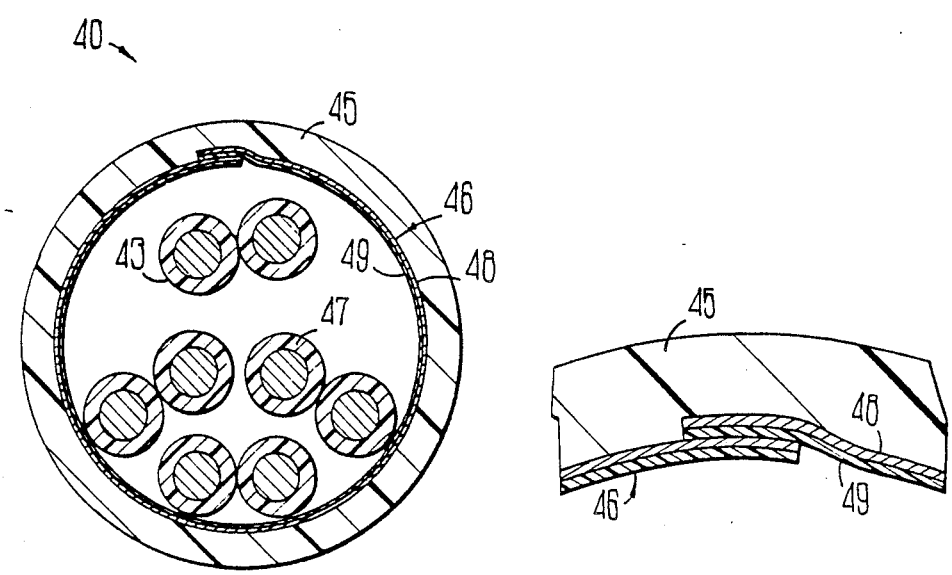
FIG. 8 is a detail view of a portion of the cable of FIGS. 6 and 7.

The shield 46 preferably is a laminate which includes a metallic layer 48 (see FIG. 8) and a film 49 which is adhered to the metallic layer. The film comprises plastic material such as a polyetherimide, a silicone-polyimide copolymer or a blend of polyetherimide and silicone-polyimide copolymer. In the blend, the polyetherimide may range from about 0% to 100% by weight of the blend constituents. In a preferred embodiment, the thickness of each of the two layers of the laminate is 0.001 inch.

It is important that the shield remain wrapped about the core. This is accomplished by wrapping a binder ribbon 50 about the shield after the shield has been wrapped about the core.

The cables of this invention include transmission media covers and jackets which have a range of thickness. But in each case, the cable passes the flame retardancy and smoke characteristics tests which are required today by the UL 910 test as well as provide relatively low corrosivity and acceptable low toxicity.

Surprisingly, the cable of this invention which includes non-halogenated insulation materials not only meets acceptable industry standards for flame spread and smoke generation properties, but also it has relatively low corrosivity and a suitably low level of toxicity when compared to prior art plenum cables. The

TABLE I

| PLENUM CABLE EXAMPLE | PRESENT HALOGENATED CABLE | | CABLE OF THIS INVENTION | |
|---|---|---|---|---|
| | 1 | 2 | 3 | 4* |
| CABLE MATERIALS | | | | |
| Insulation | HALAR ® fluoropolymer | HALAR ® fluoropolymer | ULTEM ® polyetherimide | ULTEM ® polyetherimide |
| Jacket | HALAR ® fluoropolymer | SOLEF ® fluoropolymer | HALAR ® fluoropolymer | SOLEF ® fluoropolymer |
| PROPERTY | | | | |
| A. Smoke generation | | | | |
| max optical density | 0.28 | 0.30 | 0.12 | 0.14 |
| avg. optical density | 0.11 | 0.06 | 0.02 | 0.04 |
| B. Corrosivity | | | | |
| % acid-gas generation | 42 | 41 | 26 | 25 |
| C. $LC_{50}$ (grams) | 25 ± 7 | 12 ± 2 | 46 ± 11 | 36 ± 7 |
| D. Outside Diameter (inch) | 0.139 | 0.140 | 0.139 | 0.140 |
| E. Jacket thickness (inch) | 0.010 | 0.012 | 0.012 | 0.012 |

*Calculated Values

Each of the cables in TABLE I included four pairs of 24 gauge copper conductors each having a 0.006 inch thick insulation cover. The insulation and jacket of the present halogenated cable comprised a fluoropolymer. The insulation and the jacket of cables of this invention were comprised of non-halogenated and halogenated plastic materials, respectively. The preferred insulation material is ULTEM ® polyetherimide and the jacket is HALAR ® fluoropolymer.

Figure 6:
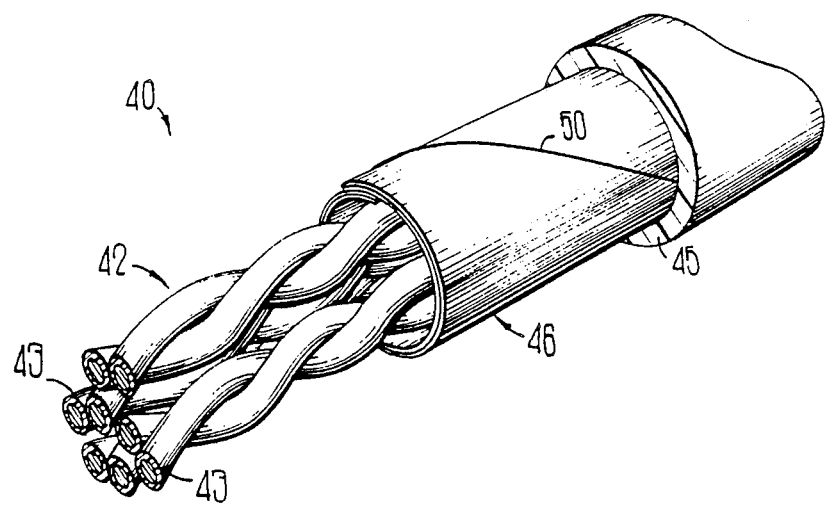
FIGS. 6 and 7 are perspective and end cross-sectional views of an alternate embodiment of a cable of this invention with spacing among pairs of conductors being exaggerated.

In another embodiment, a cable 40 (see FIGS. 6 and 7) includes a core 42 which comprises transmission media such as twisted pairs of metallic conductors 43—43, and a jacket 45. Interposed between the core 42 and the jacket is a laminated metallic shield 46 with or without a core wrap (not shown). Each of the conductors 43—43 is provided with an insulation cover 47 which comprises a polyetherimide, a silicone-polyimide copolymer or blends thereof with each constituent of the blend composition ranging from about 0% to 100% result is surprising and unexpected because it has been thought that non-halogenated materials which would have acceptable levels of flame spread and smoke generation were excessively rigid and that those which had suitable flexibility would not provide suitable flame spread and smoke generation properties to satisfy industry standards. The conductor insulation and the jacketing material of the claimed cable cooperate to provide a system which delays the transfer of heat to the transmission members. Because conductive heat transfer, which decomposes conductor insulation, is delayed, smoke emission and further flame spread are controlled. Further, the combination of a non-halogenated insulation and a halogenated jacket provides relatively low corrosivity and acceptable levels of toxicity.

The cable 20 of this invention is advantageous from several standpoints. It overcomes prior art problems of using fluoropolymer insulation and provides an insulation having acceptable flame retardance as well as lower levels of corrosion and toxicity. Whereas a jacket comprising polyetherimide may not have as high a flexibility as desired, the jacket of this invention is sufficiently flexible and has excellent flame retardance.

It is to be understood that the above-described arrangements are simply illustrative of the invention. Other arrangements may be devised by those skilled in the art which will embody the principles of the invention and fall within the spirit and scope thereof.

We claim:

1. A communications cable, which comprises:
a core which comprises at least one transmission medium:
a non-halogenated plastic material which encloses said at least one transmission medium, said plastic material which encloses said at least one transmission medium being a composition which includes a constituent which is selected from the group consisting of a polyetherimide, a silicone-polyimide copolymer, and compositions which include a polyetherimide and a silicone-polyimide copolymer; and
a jacket which encloses said at least one transmission medium and which comprises a halogenated material.

2. The cable of claim 1, wherein said jacket comprises a fluoropolymer material.

3. The cable of claim 1, wherein said jacket comprises a composition which includes a copolymer of ethylene chlorotrifluoroethylene.

4. The cable of claim 3, wherein said jacket comprises a composition which also includes a stabilizer.

5. The cable of claim 1, wherein said jacket comprises a polyvinylidene fluoride plastic material.

6. The cable of claim 1, wherein said jacket comprises a hexofluoropropylene plastic material.

7. The cable of claim 1, wherein said cable includes a thermal barrier which is disposed between said core and said jacket.

8. The cable of claim 7, wherein said thermal barrier is a laminate which includes a plastic material which is selected from the group consisting of a polyetherimide, a silicone polyimide copolymer, and blends of a polyetherimide and a silicone-polyimide copolymer.

9. The cable of claim 1, wherein said plastic material which encloses said at least one transmission medium has a wall thickness which is in the range of about 0.005 to 0.007 inch.

10. The cable of claim 1, wherein said transmission medium comprises a metallic conductor.

11. The cable of claim 10, wherein said metallic conductor is made of copper.

12. The cable of claim 1, which includes a plurality of optical fiber transmission media.

13. The cable of claim 12, wherein each said optical fiber transmission medium is enclosed in a layer of a silicone-based copolymer plastic material.

14. The cable of claim 13, wherein said plurality of optical fiber transmission media are arrayed about a tube which encloses a central organizing member and wherein a plurality of strength members are disposed between said media and said jacket.

* * * * *